May 27, 1958 L. S. SCHMITZ ET AL 2,836,310
BARN LITTER COLLECTING AND LOADING APPARATUS
Filed Nov. 4, 1953 2 Sheets-Sheet 1

INVENTORS:
LEONARD S. SCHMITZ
MATHIAS L. SCHMITZ
BY Rummler, Rummler & Snow
ATT'YS May 27, 1958 L. S. SCHMITZ ET AL 2,836,310
BARN LITTER COLLECTING AND LOADING APPARATUS
Filed Nov. 4, 1953 2 Sheets-Sheet 2
FIG. 4
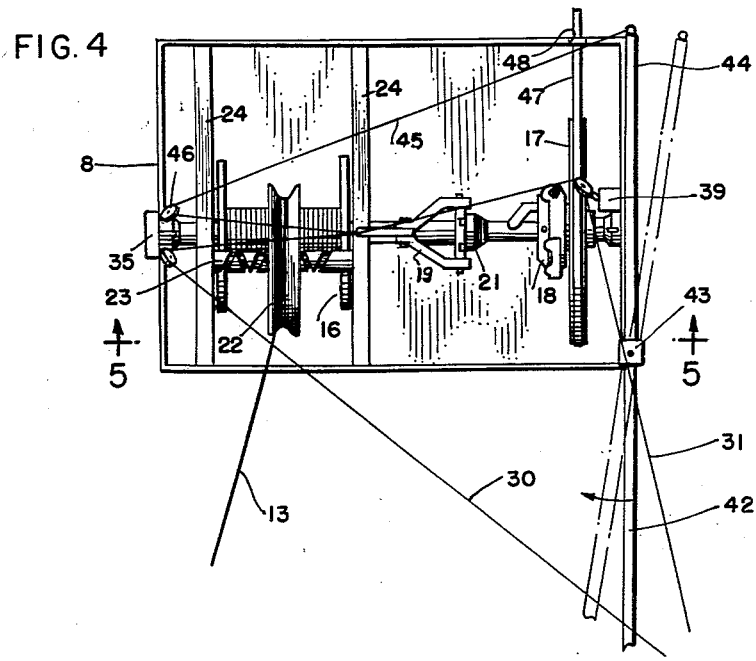
FIG. 5
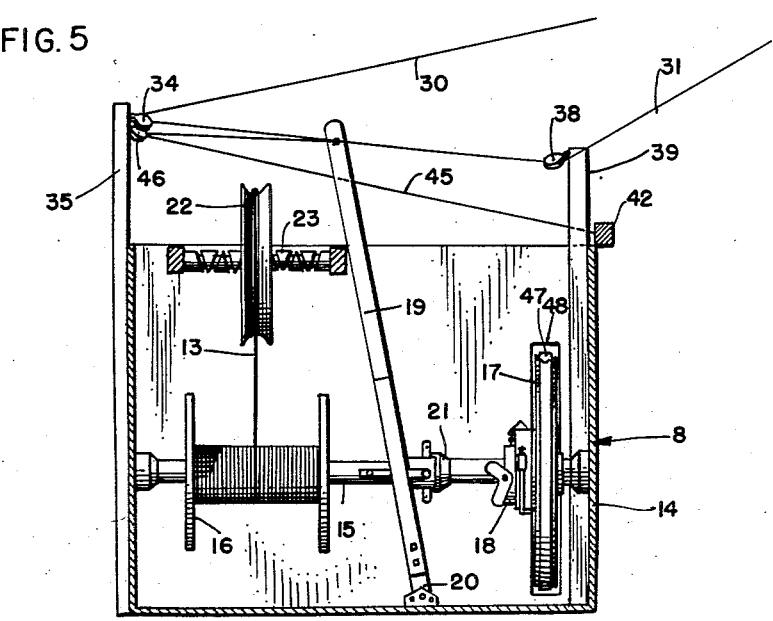
FIG. 6
INVENTORS:
LEONARD S. SCHMITZ
MATHIAS L. SCHMITZ.
BY *Rummler, Rummler & Snow*
ATT'YS United States Patent Office 2,836,310
Patented May 27, 1958

2,836,310

BARN LITTER COLLECTING AND LOADING APPARATUS

Leonard S. Schmitz and Mathias L. Schmitz, Chicago, Ill.

Application November 4, 1953, Serial No. 390,119

2 Claims. (Cl. 214—41)

This invention relates to barn cleaning devices and particularly to devices for gathering and removing manure and bedding litter and loading the same directly into a manure spreader.

Present mechanical barn cleaning devices usually employ a system of conveyors, of the endless chain type, which operate in the usual stall-end gutters to gather the manure and litter deposited therein and deliver the same to a mechanical elevator means which deposits the material outside of the barn either in a compost heap or directly into a manure spreader apparatus. Other barn cleaning devices employ a dragline scoop or shovel which operates in the gutter to deliver the material to an elevator apparatus which in turn conveys the material through a side opening in the barn for deposit onto a heap or into a spreader. In either case the mechanical means employed are expensive to install and maintain, structural changes in the barn and the concrete barn floor are required, and expensive electric motors and wiring must be installed. Also space required for the mechanisms occupies room where additional animals could be housed.

The main object of the present invention is to provide a barn cleaning and material handling means which requires no installation of mechanical equipment within the barn or changes in the usual barn structure and which at the same time gathers the waste material directly into a spreader conveyance without the slow and arduous task of manually shoveling and lifting the material.

Other principal objects of this invention are to provide a simplified barn-waste-material handling means; to provide such a device which is installed and operated as a part of a conventional manure spreading conveyance; to provide such a device which normally operates from outside of the barn structure and through substantially any of the usual barn door openings; to provide such a device that can be readily controlled from remote locations within the barn structure; to provide such a device that can readily be powered from conventional tractor equipment employed to pull manure spreading devices; and to provide such a device that is of relatively low cost and which may be installed quickly and easily without special skill.

A specific embodiment of this invention is shown in the accompanying drawings in which:

Fig. 4 is a plan view of the drag-line winch and drive control means therefor.

Fig. 5 is a view of the same in elevation as taken on line 5—5 of Fig. 4, and

Fig. 6 is a perspective view of a drag-line scoop showing the manner of attaching the pulling cable.

Figure 2:
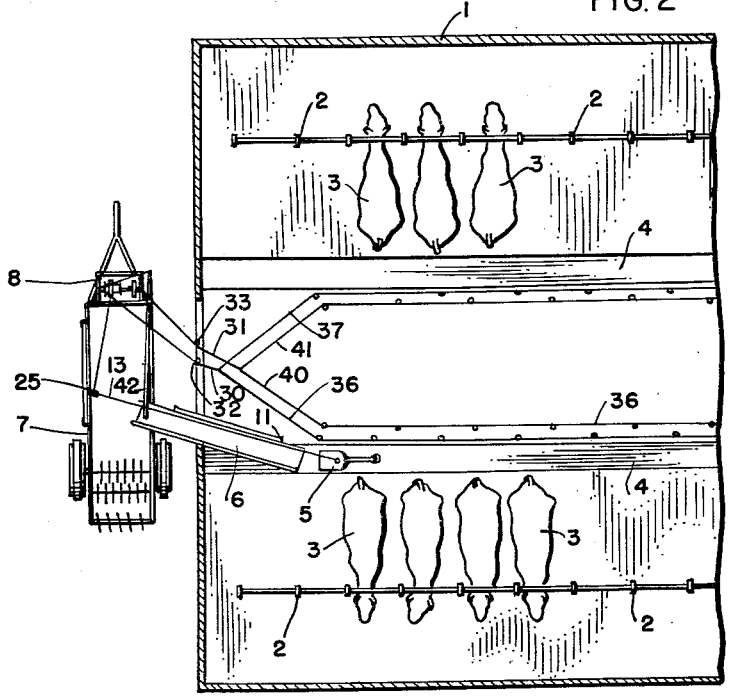
Fig. 2 is a plan view of the entrance end of a typical dairy barn showing the manner of using the invention.

In the conventional dairy barn arrangement, as indicated in Fig. 2, the milk cows are housed in the basement or floor level of the barn structure 1, which is usually provided with a concrete floor. Stanchions 2 are installed in one or more rows so that the cows 3 stand or lie in a fixed location while in the barn. A gutter or depression 4 is formed in the concrete floor behind each row of cows for the collection of manure, water, and litter, and when the cows are disposed in double rows facing opposite walls of the barn, these gutters lie parallel to each other with a passageway of six or eight feet wide between them. The gutters 4 are usually of rectangular section, and extend continuously for the length of that portion of the barn in which the cows are installed.

In the absence of a barn cleaning system, the usual procedure is to manually shovel the manure and bedding litter from the gutters into a spreader or wagon standing in the passageway between the gutters, wherever the barn structure permits driving through. In some cases the manure and litter are shoveled into a carrier traveling on an overhead track which runs to the barn door.

In the use of the invention herein described, mechanical equipment within the barn structure is obviated, and the handling of the waste material is accomplished by means of a dragline shovel 5, adapted to fit into the gutter 4, and an inclined chute 6, one end of which rests in the gutter and the other end of which rests on the top edge of the nearest sideboard of the manure spreader or wagon into which the material is to be loaded. As shown in Fig. 2, the manure spreader or conveyance is positioned across the doorway and outside of the barn, but close enough to the barn so that the chute can rest on the near side of the conveyance. The waste material in the gutters, gathered by the scoop or shovel 5, is drawn up the inclined chute 6 by means of a cable attached to the scoop and pulled by a winch arrangement 8, mounted on the manure spreader or other conveyance at its forward end, and the material is deposited into the conveyance automatically as the scoop or shovel reaches the upper or outboard end of the chute.

Figure 1:
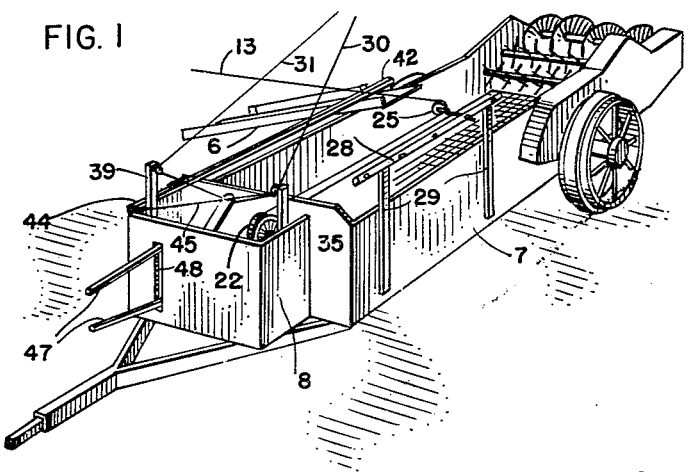
Figure 1 is a perspective view showing a conventional manure spreader to which the improved material handling means has been applied.
Figure 3:
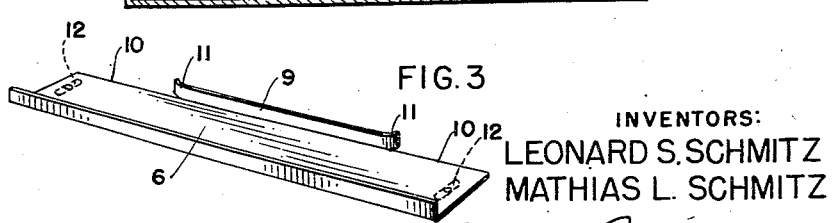
Fig. 3 is a perspective view showing a novel arrangement of lifting chute for conveying material from the barn floor gutters to the box of a manure spreader.

Preferably the chute 6 has a width slightly less than the width of the gutter 4, and the length of the chute may vary depending upon how close to the end of the gutter the manure spreader or wagon can be placed. This depends upon the barn construction, and whether or not the gutters extend to the line of the barn door. In practice, a fourteen foot chute has been found to be successful and convenient when the manure spreader can be placed more or less parallel to and within three or four feet of the barn door opening.

Where the gutters 4 do not end in the barn passageway, but rather butt against the barn wall or foundation beside the door, a specially designed chute is employed which can be placed in the gutter at an angle so as to clear the side wall of the barn and pass through the doorway to reach the side board of the manure spreader or wagon 7. Such a chute is shown in Figs. 1 and 3 and is preferably arranged so as to be reversible to accommodate the gutters on each side of the barn passageway without necessarily changing the position of the manure spreader or wagon. As shown, one side wall 9 of the chute 6 is cut away inwardly from each end of the chute as at 10, and the ends of the side wall 9 are then flared outwardly as at 11. This permits the end of the chute to rest flatly on the bottom of the gutter 4 with the flared portion 11 of the side wall resting on the barn floor at the top edge of the gutter. Also, the flared side wall permits the shovel to pass upwardly along the chute without catching on the side of the chute as it leaves the gutter and is drawn up the incline. Preferably a small pivoted cleat 12 is mounted on the under side of the chute adjacent each end for engaging the sideboard of the manure spreader and holding the chute firmly in position thereon.

As shown in Figs. 1 and 2, the winch unit 8, by means of which the dragline cable 13 is wound to pull the shovel 5, is mounted directly on the manure spreader or wagon by means of suitable brackets or on a suitable platform. Preferably, the winch unit is mounted at the forward or front end of the conveyance as a permanent part of the conveyance structure, since in that location the winch unit does not interfere with the hauling or spreading of the load.

As shown in Figs. 4 and 5, the winch unit 8 comprises a box-like housing 14, between the end walls of which a horizontal shaft 15 is journaled in suitable bearings, the shaft 15 carrying a fixedly connected winding drum 16 and drive pulley 17. The drive pulley, in the arrangement shown, is mounted on the shaft 15 for free rotation relative thereto and a clutch means 18 is provided for effecting driving engagement or disengagement of the pulley 17 and the shaft 15 which is also freely rotatable in its bearings. The clutch 18 is preferably of the type operated by a lever 19, which has one end 20 pivotally connected to the floor of the housing 14, and which has its opposite end extending upwardly beyond the top of the housing so as to be accessible for manipulation. As indiated in Fig. 4, the clutch lever 19 may be a bifurcated member which straddles the shaft 15, and has connection with a clutch operating sleeve member 21, slidable axially on a shaft 15.

As shown, a level-wind pulley or sheave 22 is mounted above the winding drum 16, on a traversing shaft disposed parallel with the shaft 15, and the traversing shaft 23 is mounted between support members 24 extending between the side walls of the housing 8. As will be understood, the traversing shaft 23 is held in fixed position and is appropriately grooved to provide tracks along which the pulley 22 travels back and forth on the shaft, from one end to the other, as it is rotated under the driving action of the dragline cable 13 as it passes over the pulley to reach the winding drum 16. The pulley 22 thus serves the dual functions of directing the dragline cable 13 to the winding drum 16, and automatically traversing the length of the winding drum to maintain a uniform distribution of the cable on the winding drum as it is taken up thereon.

As shown in Figs. 1 and 2, the dragline cable 13 runs from the winding drum pulley 22 to a pulley block 25 suitably mounted at one side of the manure spreader or wagon, and thence along the chute 6 to the shovel 5, where it is suitably attached to the upper central portion of the shovel body by means of a fitting 26, riveted or otherwise secured to the front face of the shovel. A swivel snap connection 27 is also provided at a suitable location in the dragline cable 13, adjacent the shovel 5, for disconnecting the shovel from the cable when desired.

Preferably the pulley block 25, for directing the dragline cable 13 to the winch pulley 22, is mounted on a fixed rail 28, attached to the sideboard of the vehicle 7, on the side opposite the side on which the chute 6 rests, the rail 28 being supported on stanchions 29 extending upwardly along the vehicle side wall and suitably attached thereto to withstand the pulling load on the cable 13 as it drags a full shovel along the trough 4 and up the chute 6. Preferably the rail 28 extends substantially the length of the loading space in the vehicle 7, and is provided with means, such as apertures spaced along the length of the rail, for attachment of the pulley block 25 at various locations lengthwise of the vehicle as may be desired. The purpose of this arrangement is to permit shifting of the vehicle, or the chute 6, so that the material being loaded can be uniformly spread over the vehicle load-carrying area and at the same time permit location of the pulley block 25, in substantial alignment with the upper end of the chute 6, whereby a straight pull on the shovel lengthwise of the chute will be had.

In order to provide for remote manual control of the clutch 18, by means of the clutch actuating lever 19, a pair of pull lines or cables 30 and 31 are connected to the upper end of the clutch operating lever 19 and are extended into the barn over suitable pulleys 32 and 33 mounted on the upper door frame.

The cable 30, which operates the clutch lever 19 to disconnect the driving pulley 17 from the shaft 15, leads from the lever 19 to a pulley 34 mounted on a vertical support 35 at the outermost end of the winch housing, thence to the pulley 32 where the cable enters the barn. On the interior of the barn the cable 30 is branched into two leads 36 and 37, which are extended down respective sides of the central barn passageway whereby to provide a convenient means for stopping the operation of the winch from any point along either of the troughs 4. The second cable 31 extends from the clutch operating lever 19 to a pulley 38 mounted on a vertical support 39, at the opposite ends of the winch housing, and thence over the pulley 33 to the interior of the barn where it is branched by leads 40 and 41, which extend along each trough adjacent and parallel with the leads 36 and 37. By this means the winch can be started from the interior of the barn and from any point along the length of the troughs 4.

It is contemplated that the winch control cables 36—37 and 40—41 will be suitably supported from the ceiling of the barn passageway by means of fixed rings or guides and will remain permanently in place. Therefore, at a convenient location between the pulleys 34 and 32, and between the pulleys 38 and 33, suitable detachable connecting means will be provided so that the respective cables can be parted to permit removal of the manure spreader or wagon, and to permit the insertion or removal of suitable cable length to adjust for the position of the wagon or manure spreader with respect to the barn door.

Also, an automatic means is provided for disconnecting the clutch 18 and drive pulley 17, when the shovel 5 has reached the upper end of the chute 6 for dumping its load into the vehicle 7. As shown, this automatic winch stopping means comprises a lever bar 42, which is pivotally mounted on the forward end of the vehicle body, or on the side wall of the winch housing, as shown at 43 in Fig. 4. The lever bar 42 extends from its pivot mounting, along the sideboard of the vehicle, a sufficient distance to overhang the upper end of the chute 6, as it rests on the vehicle sideboard at any location therealong, and the opposite end 44 of the lever bar extends from the other side of the pivot mounting 43 to a point substantially at the forward side of the winch housing.

A clutch operating cable 45, having one end attached to the end 44 of the lever bar, extends over a pulley 46 mounted on the support 35, and thence to the upper end of the clutch operating lever 19. Thus, when the loaded shovel reaches the upper end of the chute 6, it will engage the overhanging end of the lever bar 42 and cause the same to swing, as shown in dotted outline in Fig. 4, thereby pulling the cable 45 to shift the clutch lever 19 to its disconnecting position and stopping the operation of the winding drum.

Since the winding drum drive-pulley 17 is freely rotatable relatively to the shaft 15, when the clutch 18 is disconnected, the dragline cable 13 can be readily unwound from the winch drum 16 by merely pulling on the shovel 5 to carry it back to the interior of the barn for picking up another load.

A feature of the present invention is the fact that the cable winch may be driven from the usual power take-off of substantially any conventional tractor that may be connected to the vehicle 7 to pull the same. In the arrangement shown, where the winding drum shaft 15 is driven by a pulley or a sheave 17, the pulley 17 will be driven by means of a suitable belt 47, extending through an opening 48 in the forward wall of the winch housing, which belt will run to the power take-off pulley usually provided on the conventional tractor. It will be understood, however, that where the power take-off from the tractor is by way of a drive shaft, and flexible coupling, a suitable gear and driving worm arrangement may be substituted for the pulley 17 and belt 47 respectively. Also, it will be understood that the arrangement and location of the components comprising the winch mechanism may be varied to accommodate the location of the tractor power take-off when the tractor is in normal coupled relation with the vehicle 7.

The dragline cable should be of braided wire of small diameter with sufficient strength to drag a load of several hundred pounds. Also the dragline should be quite flexible so that it will hang limp in order to provide for easy winding on the winch, and for easy manipulation when unwinding the winch to pull the shovel back to the interior of the barn. A braided steel wire one and one-eighth inches in diameter has been successfully used for this purpose. Also, the drive for the winch should be arranged to provide a winding speed substantially equivalent to the normal walking gait for the operator.

In the operation of the improved barn cleaning apparatus, the usual procedure, after the shovel and the control lines have been connected to the winch mechanism, is to start adjacent the end of the gutter nearest the barn door and at a point far enough along the gutter to take as much of the waste material as the scoop will push without overflowing the rear end of the scoop. The operator, after placing the scoop or shovel at an appropriate location along the gutter, starts the winch operation by pulling on the appropriate branch 36 or 37 of the starting cord 31, and as the winch takes up the cable, the operator walks along the gutter and thence along the side of the chute 6, guiding the shovel by means of its handle, until the shovel, pushing the waste material ahead, reaches the upper end of the chute 6, where the load is pushed off the end of the chute and into the vehicle. At this point the winch operation is automatically stopped by the engagement of the shovel with the overhanging end of the swivel bar 42.

Because the shovel or scoop is not lifted by hand during the waste material gathering and loading operation, but rather pushes the material ahead, it will easily handle a considerably greater amount of material than would be practicable by the usual manual shoveling methods, and hence the cleaning of the gutters is accomplished in a much shorter time, and with practically no lifting effort on the part of the operator. After the load has been deposited into the vehicle, the operator returns the shovel to an appropriate position along the gutter sufficiently farther back to take up another load. This operation is repeated until the gutter is clean. Then to clean the second gutter, the operator merely reverses the position of the inclined chute 6 and starts working on the second gutter in the same manner as with the first.

As the vehicle becomes filled its position relative to the barn door can be changed, by moving the vehicle either forward or back, in order to deposit the load at different locations in the load-carrying area and, in any case, the location of the pulley 25 along the pulley support rail 28 is shifted to be substantially in alignment with the upper end of the chute 6, so that the pulling force on the shovel will be in the lengthwise direction of the chute.

The main advantages of this invention reside in the particular combination of the winch and dragline equipment with a manure spreader or vehicle whereby the apparatus may be driven under remote control from the power take-off of the tractor utilized to pull the load carrying vehicle and whereby the installation of any mechanical load handling apparatus within the barn is obviated. Other advantages reside in the relatively low cost of the apparatus involved; in the fact that the apparatus can be easily operated and maintained without the need for mechanical skill; in the simplicity of the unitary arrangement of the apparatus whereby it can readily be incorporated as an integral part of substantially any manure spreading device; and in the fact that the only parts of the apparatus subject to deterioration because of contact with the material handled, are the chute and the shovel, each of which can readily be kept clean by simply washing with a hose.

Although but one specific embodiment of this invention is herein shown and described, it will be understood that details of the apparatus and arrangement shown may be altered or omitted without departing from the spirit of this invention as defined by the following claims:

We claim:

1. A barn litter loading means comprising a load carrying vehicle having a pair of side boards, a winch mounted on said vehicle, means at one side of said vehicle for mounting a pulley block, a pulley block on said means in proximate substantially vertical registration with the side board for said one side, a cable connected to said winch and leading through said pulley block and thence laterally outboard from the opposite side of said vehicle, a chute resting on a sideboard of said opposite side of the vehicle and extending downwardly therefrom to ground level, a scoop having connection with the outboard end of said cable and adapted to be pulled toward the vehicle and onto said chute lengthwise thereof; drive means for said winch, a clutch for connecting and disconnecting said drive means and said winch, a shiftable operating lever for selectively actuating said clutch, manually operable pull lines connected to said operating lever for moving said lever in opposite directions, said pull lines leading to a common location remote from said vehicle and along the path of said scoop, and means having connection with said operating lever and disposed in the path of said scoop adjacent the upper end of said chute for moving said lever in the direction to release said clutch when said scoop reaches a predetermined position along the chute.

2. A barn litter loading means comprising a manure spreader vehicle having a pair of side boards, a winch mounted at the forward end of said vehicle, a support bar extending longitudinally of said vehicle at one side thereof above the load carrying space and having means at spaced intervals for attaching a pulley block, a pulley block on said support bar, a cable connected to said winch and leading through said pulley block and thence laterally outboard from the opposite side of said vehicle, a chute resting on a sideboard of said vehicle opposite said first sideboard and extending downwardly and outwardly therefrom to ground level, a scoop having connection with the outboard end of said cable and adapted to be pulled toward said vehicle and along said chute lengthwise thereof, drive means for said winch, a clutch for connecting and disconnecting said drive means and said winch, an operating lever for said clutch, manually operable pull lines connected to said operating lever for moving said lever in opposite directions to operate said clutch, said pull lines leading to a common location remote from said vehicle and adjacent the path of said scoop, and means on said vehicle having connection with said operating lever and disposed across the path of said scoop adjacent the upper end of said chute for shifting said lever in the direction to release said clutch when said scoop reaches a predetermined position along said chute.

(References on following page)

References Cited in the file of this patent

UNITED STATES PATENTS

| | | |
|---|---|---|
| 523,034 | Fourman | July 17, 1894 |
| 792,488 | Anderson | June 13, 1905 |
| 986,903 | Brown | Mar. 14, 1911 |
| 1,699,175 | Yarn | Jan. 15, 1929 |
| 1,810,512 | Worst | June 16, 1931 |
| 2,353,533 | Wood | July 11, 1944 |
| 2,395,238 | Thwaites | Feb. 19, 1946 |
| 2,639,803 | Tonagel et al. | May 26, 1953 |

FOREIGN PATENTS

| | | |
|---|---|---|
| 110,849 | Australia | June 18, 1940 |